(12) United States Patent
Jang

(10) Patent No.: US 7,719,984 B2
(45) Date of Patent: May 18, 2010

(54) NETWORK COMMUNICATION SYSTEM AND CONTROL METHOD THEREOF

(75) Inventor: Hye-on Jang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 11/445,254

(22) Filed: Jun. 2, 2006

(65) Prior Publication Data
US 2007/0070964 A1    Mar. 29, 2007

(30) Foreign Application Priority Data
Sep. 27, 2005    (KR) ........................ 10-2005-0089900

(51) Int. Cl.
H04L 12/28    (2006.01)
H04W 4/00    (2009.01)
H04B 7/00    (2006.01)
G06F 15/16    (2006.01)

(52) U.S. Cl. .................. 370/235; 370/338; 370/395.42; 455/512; 709/207

(58) Field of Classification Search ................ 370/338, 370/328, 310, 444, 493, 455, 229–234, 235–238, 370/315–316; 455/435.3, 512; 709/205–207, 709/223–226
See application file for complete search history.

(56) References Cited

U.S. PATENT DOCUMENTS

| | | | | |
|---|---|---|---|---|
| 6,738,361 | B1 * | 5/2004 | Immonen et al. | 370/328 |
| 7,245,595 | B2 * | 7/2007 | Kim et al. | 370/328 |
| 7,263,377 | B1 * | 8/2007 | Wahlstrom et al. | 455/512 |
| 7,403,504 | B2 * | 7/2008 | Sawabe et al. | 370/331 |
| 2002/0093976 | A1 * | 7/2002 | Razoumov et al. | 370/444 |
| 2003/0096597 | A1 * | 5/2003 | Kar-Kin Au et al. | 455/412 |
| 2003/0182309 | A1 * | 9/2003 | Namekata et al. | 707/104.1 |
| 2004/0071107 | A1 * | 4/2004 | Kats et al. | 370/328 |
| 2004/0095901 | A1 * | 5/2004 | Rajkotia | 370/328 |
| 2004/0105415 | A1 * | 6/2004 | Fujiwara et al. | 370/338 |
| 2005/0171801 | A1 * | 8/2005 | Hartman | 705/1 |
| 2005/0271021 | A1 * | 12/2005 | Alemany et al. | 370/338 |
| 2009/0290553 | A1 * | 11/2009 | Matsukura et al. | 370/329 |

* cited by examiner

Primary Examiner—Tri H Phan
(74) Attorney, Agent, or Firm—Sughrue Mion, PLLC

(57) ABSTRACT

A network communication system and a method of controlling the network communication system are provided. The network communication system includes: a member reading at least one piece of data stored in an access point (AP); a member giving priority to the data; a member re-transmitting the data having the priority to the AP; and a member processing the data in the AP according to the priority. Thus, data can be efficiently processed according to predetermined priority using a low-end type AP as a high-end type AP is used.

14 Claims, 4 Drawing Sheets

NETWORK COMMUNICATION SYSTEM AND CONTROL METHOD THEREOF

CROSS-REFERENCE TO RELATED APPLICATIONS

This application claims priority from Korean Patent Application No. 10-2005-0089900 filed Sep. 27, 2005, in the Korean Intellectual Property Office, the disclosure of which is incorporated herein by reference.

BACKGROUND OF THE INVENTION

1. Field of the Invention

The present invention relates to a network communication system and a control method thereof, and more particularly, to a network communication system using a priority processor to use a low-end type access point as a high-end type access point and a control method thereof.

2. Description of the Related Art

In general, an IEEE 802.11 wireless local area network (WLAN) does not use a cable to build a network system but uses air waves as a communication channel for a wireless medium, such as radio waves or infrared rays. Such an IEEE 802.11 WLAN transforms frames of an IEEE 802.11 network into another type of frame to transmit the frames of the IEEE 802.11 network to other networks. The IEEE 802.11 WLAN includes an access point for building a bridge between wireless and wired networks and stations such as a notebook, a personal digital assistant (PDA), and a desktop computer interfacing with the wireless network.

The access point can be classified into a low-end type access point and a high-end type access point. The low-end type access point provides a simple communication mode to process data of a corresponding station in the order of accessing the stations, without an additional option, so as to transmit the data to a destination. The high-end type access point provides various options and processes data of a corresponding station according to a predetermined priority to transmit the data to a destination.

In general, the low-end type access point uses a first come, first serve method to allocate priorities to the stations in the order of transmitting response signals to broadcast beacon signals to the stations and allow access according to the priorities to process data. Thus, the low-end type access point supports only the simple communication mode and enables a network to be built at a low cost. However, in a case where a corresponding station accesses the low-end type access point in a low order (e.g., later in a queue) to process urgent business, processing of the urgent business is delayed.

The high-end type access point includes multiple buffers whose priorities have been determined to store data transmitted from each station in a buffer corresponding to a priority of a corresponding station, so as to first process the data stored in the buffer having a high priority. A buffer having a high priority is not guaranteed first access to a network to process data. However, the buffer having the high priority is given an opportunity. Thus, if the buffer does not access the network at the given opportunity, data stored in a buffer having a next priority is processed. As a result, if the data stored in the buffer failing to have accessed the network at the given opportunity is related to important business, processing of the important business is likely to be delayed. Also, multi-buffers must be installed in the high-end type access point, and the system additionally requires equipment such as a router and the like, which increase cost.

Low-priced, low-end type access points are more widely used in specific organizations such as hospitals, schools, companies, and the like during building of a network than high-end type access points requiring a large amount of cost. Thus, in a case where a low-end type access point is installed, a demand for solving a delay of urgent business according to access order due to a limited infrastructure is gradually increased.

To satisfy the demand, a method of using a low-end type access point as a high-end type access point instead of using a high-priced, high-end type access point to build a network is required.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above. The present invention provides a network communication system capable of efficiently processing data according to predetermined priority using a low-end type access point like a high-end type access point is used and a control method thereof.

According to an aspect of the present invention, there is provided a network communication system comprising: an access point (AP) storing at least one piece of data to be processed and transmitting the data to a destination, where the data is being transmitted from a plurality of stations; and a priority processor reading, the data from the AP, determining a priority of the data, and re-transmitting the data to the AP. The AP may process the data according to the priority.

The priority processor may determine the priority of the data to be processed according to at least one of standards of types of business performed by the data and users having requested the data to be processed.

The priority processor may compare the data read from the AP based on a predetermined priority list and arrange the data according to the priority determined by the comparison.

The priority list may comprise weights given to the types of businesses and the users.

According to another aspect of the present invention, there is provided a priority processor comprising: a first storage storing at least one piece of data read from an AP; a priority determiner comparing the data stored in the first storage based on a predetermined priority list to give priority to the data; and a controller reading the data from the AP to store the data in the first storage and transmitting the data having the priority determined by the priority determiner to the AP to process the data according to the priority.

The priority processor may further comprise a second storage arranging and storing the data according to the priority determined by the priority determiner.

The controller may transmit the data stored in the second storage to the AP in the order arranged.

The priority processor may further comprises a third storage storing the predetermined priority list.

The priority may be determined by at least one of standards of types of business performed by the data to be processed and users having requested the data to be processed.

According to another aspect of the present invention, there is provided a method of controlling a network communication system, comprising: reading at least one piece of data stored in an AP; giving priority to the read data; re-transmitting the data having the priority to the AP; and processing the data in the AP according to the priority.

The giving of the priority to the data may comprise: storing the data read from the AP; comparing the data based on a predetermined priority list; and arranging the data according to the priority determined by the comparison.

The reading of the at least one piece of data stored in the AP may comprise: reading memory addresses of the AP storing the data; and reading the data with reference to the read memory addresses.

BRIEF DESCRIPTION OF THE DRAWINGS

The above and/or other aspects of the present invention will be more apparent by describing exemplary embodiments of the present invention with reference to the accompanying drawings, in which.

DETAILED DESCRIPTION OF THE EXEMPLARY EMBODIMENTS

Figure 1:
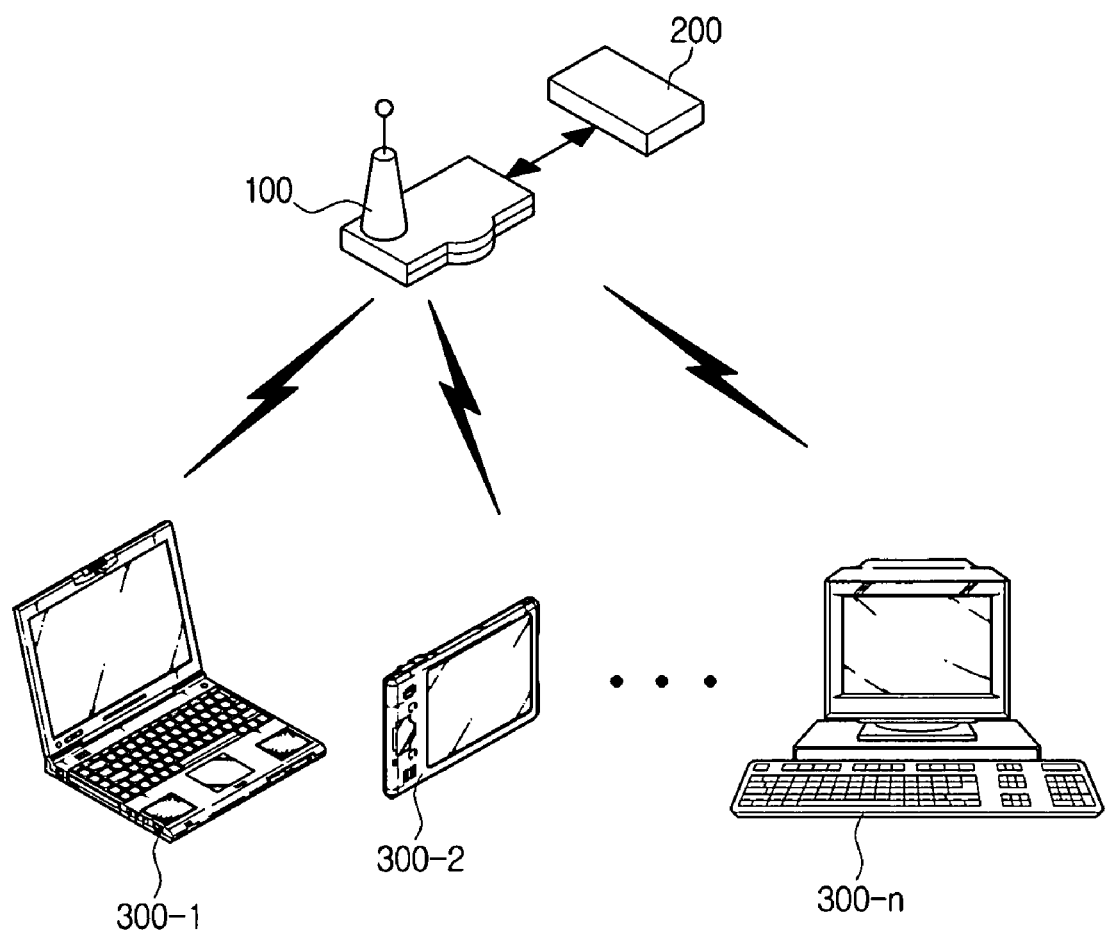
FIG. 1 is a schematic view of a network communication system according to an exemplary embodiment of the present invention.

Exemplary embodiments of the present invention will be described in greater detail with reference to the accompanying drawings.

In the following description, the same drawing reference numerals are used for the same elements even in different drawings. Descriptions of non-limiting exemplary embodiments of the present invention are provided to assist in a comprehensive understanding of the invention. It is apparent that the scope of the present invention is not bounded by the particular construction and elements defined in the description. Also, well-known functions or constructions are not described in detail since they would obscure the invention in unnecessary detail.

FIG. 1 is a schematic view of a network communication system according to an exemplary embodiment of the present invention. Referring to FIG. 1, the network communication system comprises at least one access point (AP) 100, a priority processor 200, and a plurality of stations 300-1, 300-2, . . . , and 300-n.

The AP 100 can transmit data to and/or receive data from the plurality of stations 300-1, 300-2, . . . , and 300-n positioned in a service area of the AP 100 through a wireless medium such as radio waves or infrared rays. The AP 100 bridges data transmitted from the plurality of stations 300-1, 300-2, . . . , and 300-n or an external source to a destination. The destination may be a station positioned in the service area of the AP 100 or other stations connected to the AP 100 through a wire network. In the present exemplary embodiment, the AP 100 may be a low-end type AP processing data using a first come, first serve method. The plurality of stations 300-1, 300-2, . . . , and 300-n may be devices, such as a notebook, a PDA, and a desktop computer, that can transmit data to and/or receive data from the AP 100 through a wireless medium.

Figure 2:
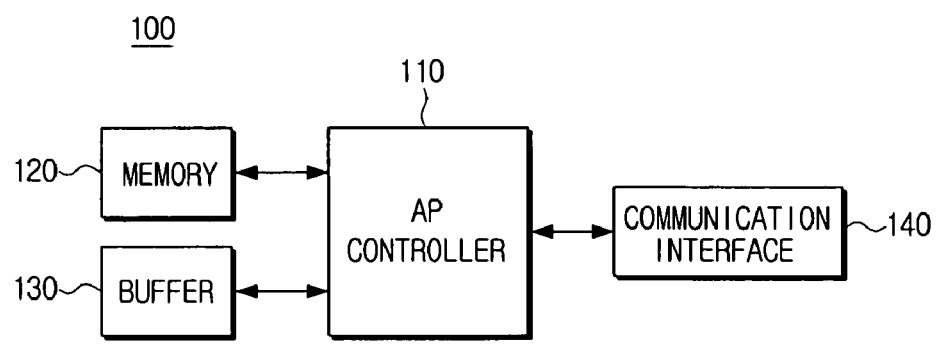
FIG. 2 is a block diagram of an access point according to an exemplary embodiment of the present invention.
Figure 3:
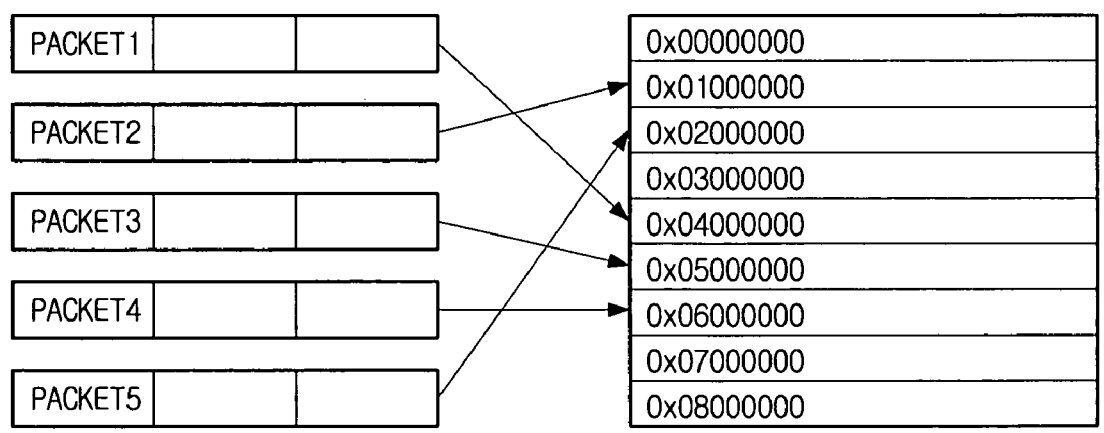
FIG. 3 is a view illustrating an operation of storing packets transmitted from stations in a memory of the access point shown in FIG. 2.

The AP 100 will now be described in more detail with reference to FIGS. 2 and 3. The AP 100 comprises an AP controller 110, a memory 120, a buffer 130, and a communication interface 140.

The AP controller 110 controls the storing of packets, into which data transmitted from the plurality of stations 300-1, 300-2, . . . , and 300-n are decoded, in the memory 120. The AP controller 110 controls the storing of memory addresses, such that memory addresses store the data to be processed in the buffer 130. For example, in a case where packets PACKET 1, PACKET 2, PACKET 3, PACKET 4, and PACKET 5 are transmitted in order and stored in memory addresses 0x0400000, 0x0100000, 0x0500000, 0x0600000, and 0x0200000, the AP controller 110 stores the memory addresses 0x0400000, 0x0100000, 0x0500000, 0x0600000, and 0x0200000 in the buffer 130 in order. The AP controller 110 processes the data to be processed in the order of being transmitted to the AP 100 (i.e., in the order of being stored in the memory 120) and transmits the processed data to a destination.

Also, the AP controller 110 stores data arranged and re-transmitted from the priority processor 200 according to priority in the memory 120, processes the data according to the priority, and transmits the data to the destination. For this purpose, the AP controller 110 arranges the data stored in the memory 120 according to the priority and then re-stores the data in the memory addresses of the buffer 130 so as to process the data to be processed according to the priority determined by the priority processor 200. Thus, the data processed using the first come, first serve method may be processed according to the priority determined by the priority processor 200. The priority processor 200 will be described in detail later.

The memory 120 stores the data transmitted from the plurality of stations 300-1, 300-2, . . . , and 300-n and re-stores the data arranged by the priority processor 200 according to the priority in the memory addresses of the buffer 130 according to the priority. The buffer 130 stores the memory addresses storing the data transmitted from the plurality of stations 300-1, 300-2, . . . , and 300-n.

The communication interface 140 provides interfaces with the plurality of stations 300-1, 300-2, . . . , and 300-n to transmit data to and/or receive data from the plurality of stations 300-1, 300-2, . . . , and 300-n through a radio frequency (RF) or infrared rays and provides a communication interface between another AP (not shown) or a wired network (not shown) and the AP 100.

The priority processor 200 reads the data transmitted to and stored in the AP 100, allocates priority to the data, and re-transmits the data to the AP 100 so that the AP 100 processes data to be urgently processed according to the priority and transmits the data to a destination. The priority processor 200 will now be described in more detail with reference to FIG. 4.

Figure 4:
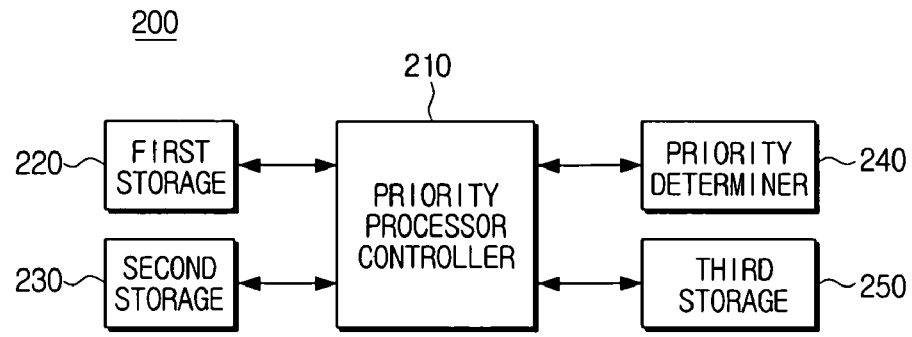
FIG. 4 is a block diagram of a priority processor according to an exemplary embodiment of the present invention.

FIG. 4 is a block diagram of a priority processor according to an exemplary embodiment of the present invention. Referring to FIG. 4, a priority processor 200 according to the present exemplary embodiment comprises a priority processor controller 210, a first storage 220, a second storage 230, a third storage 250, and a priority determiner 240.

The priority processor controller 210 reads memory addresses stored in the buffer 130 of the AP 100 by each predetermined period of time or in real-time and reads the data stored in the memory addresses from the memory 120 to store the read data in the first storage 220. The priority processor controller 210 may store the data read from the memory 120 of the AP 100 in the first storage 220 in the order of reading the data from the AP 100.

The priority processor controller 210 can access a map of the memory 120 of the AP 100 to read and write contents of an address of the map of the memory 120 of the AP 100. Also, the predetermined period may be set or changed by a manager of the network communication system according to the present invention.

The second storage 230 stores a priority list used when the priority determiner 240 determines the priority of the data read from the AP 100. The priority list may be drawn up depending on types of business performed by the data to be processed and individual users having requested to process the data, and the priority list may be set and changed by the manager of the network communication system. The second storage 230 may be a memory performing writing and/or reading such as a flash memory so that the manager is able to modify and manage the priority list. For example, in a case where the network communication system according to the present invention is built in a hospital, a priority list that will be described below may be used.

As to individual users, weight (or consideration) may be sequentially given to hospital staff, inpatients, outpatients, and visitors to generate the priority list. In the case of the hospital staff, weight may be sequentially given to doctors, nurses, managers, other office workers, and the like.

As to the types of business, weight may be given for access to a network, transmissions of records on patients between hospital staff, and requests of the hospital staff for access to previous records on patients. However, the inpatients', the outpatients', and the visitors' accesses to the network may be processed after the requests of the hospital staff for the accesses to the previous records on the patients.

For example, in cases of A (a doctor who must access a previous record on an emergency room patient), B (a manager who is to access the network to register the emergency room patient), and C (an access to the network while the emergency room patient waits), priority is sequentially given to A, B, and C based on the above exemplified priority list.

The above-described priority list may be used when the network communication system according to the present invention is built in a hospital. However, the priority list is not limited to this particular form and may be adapted to the environment in which the network or network communication system is built and operated.

The priority determiner 240 compares the data read from the AP 100 and stored in the first storage 220 based on the priority list stored in the second storage 230 and then gives priority to the data. The priority determiner 240 may sum the weights given to the types of the businesses performed by the data and the individual users. Subsequently, the priority determiner 240 gives priority to the data in the order of the most summed weights. The priority determiner 240 may give priority only to the types of business or only to the individual users.

The priority processor controller 210 arranges the data to be processed, according to the priority determined by the priority determiner 240, to store the arranged data in the third storage 250 and re-transmits the arranged data to the AP 100, in the order in which the data was arranged, to store the arranged data in the memory addresses stored in the buffer 130.

Figure 5:
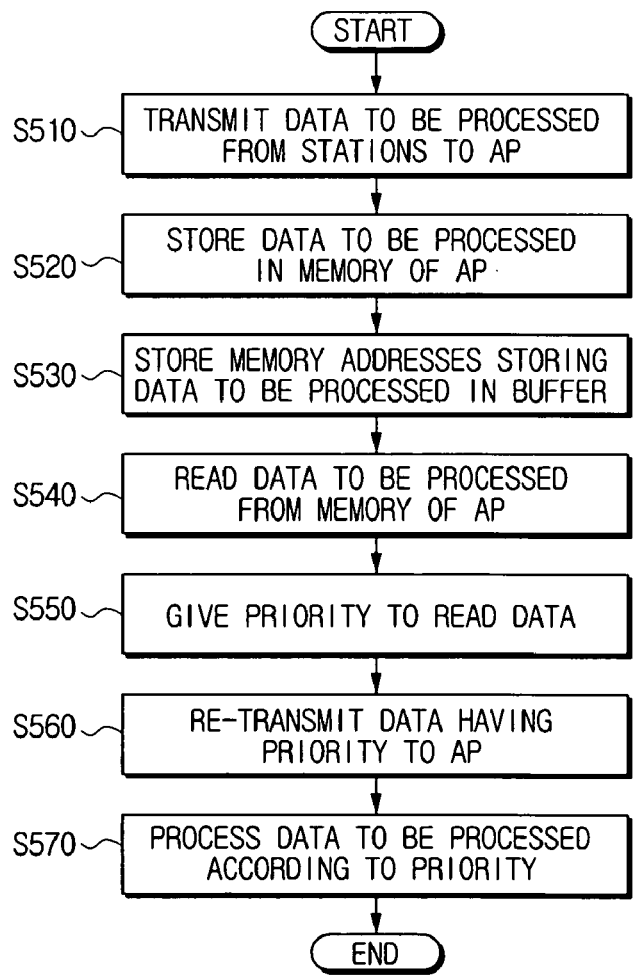
FIG. 5 is a flowchart of a method of controlling a network communication system according to an exemplary embodiment of the present invention.

FIG. 5 is a method of controlling a network communication system according to an exemplary embodiment of the present invention. Referring to FIG. 5, in operation S510, the AP 100 transmits and/or receives a beacon signal and a confirmation signal corresponding to the beacon signal and the confirmation signal from the stations 300-1, 300-2, . . . , and 300-n positioned in the service area of the AP 100 and then receives data to be processed from the stations 300-1, 300-2, . . . , and 300-n. In operation S520, the AP 100 stores the data in the memory 120. In operation S530, the AP controller 110 stores memory addresses storing the data in the buffer 130.

In operation S540, the priority processor 200 reads the memory addresses stored in the buffer 130 of the AP 100 and reads the data from the memory addresses.

In operation S550, the priority processor 200 compares the read data based on a priority list stored in the second storage 230 to give priority to the data. This process will be described in more detail with reference to FIG. 6.

Figure 6:
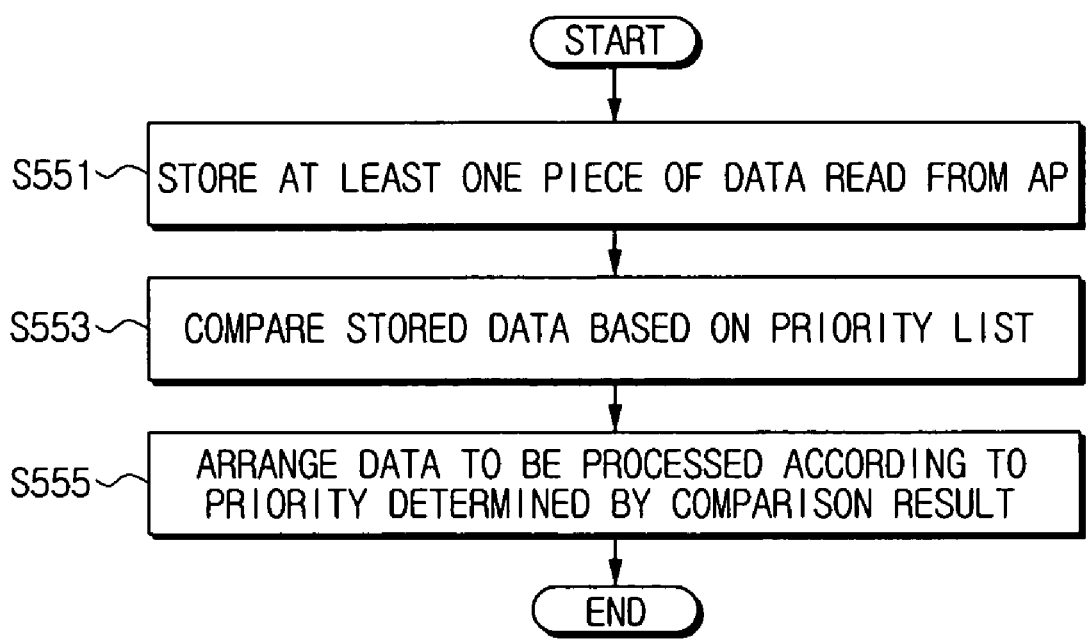
FIG. 6 is a detailed flowchart of an operation S550 of FIG. 5.

With reference to FIG. 6, in operation S551, the priority processor controller 210 reads the data stored in the memory addresses read from the buffer 130 of the AP 100 to store the read data in the first storage 220. In operation S553, the priority determiner 240 compares the data stored in the first storage 330 based on the priority list stored in the second storage 230 to give the priority to the data. In operation S555, the priority processor controller 210 arranges the data to be processed according to the priority determined in operation S553 to store the arranged data in the third storage 250. Thus, the priority processor 200 may re-arrange the data arranged in order of transmitting the data to the AP 100 according to priority.

Now, referring back to FIG. 5, in operation S560, the priority processor 200 transmits the arranged data to the AP 100 according to the priority. In operation S570, the AP 100 processes the data to be processed according to the priority to transmit the processed data to a destination.

As described above, the AP 100 and the priority processor 200 repeat operations S510 through S570 to process the data to transmit the processed data to the destination. Thus, a network communication system capable of efficiently processing business to be urgently processed according to priority without replacing a low-end type AP with a high-end type AP can be built.

As described above, according to the present invention, data can be efficiently processed according to predetermined priority using a low-end type AP, as a high-end type AP is used without replacing the low-end type AP. Thus, business to be urgently processed can be processed in an organization in which a network communication system according to the present invention is built, with priority.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A network communication system comprising:
an access point (AP) which stores data to be processed and transmits the data to a destination, wherein the data is transmitted from a plurality of stations; and
a priority processor which reads the data from the AP, determines a priority of the data, and re-transmits the data to the AP,
wherein the AP processes the data according to the priority,
wherein the priority processor determines the priority of the data to be processed according to at least one of standards of types of business performed by the data to be processed and types of users having requested the data to be processed.

2. The network communication system of claim 1, wherein the priority processor compares the data read from the AP based on a predetermined priority list and arranges the data according to the priority determined by the comparison.

3. The network communication system of claim 2, wherein the priority list comprises the types of business performed by the data, the users having requested the data to be processed, and weights given to the types of business and the users.

4. A priority processor comprising:
a first storage which stores data, which is to be transmitted to a destination, read from an access point (AP);
a priority determiner which compares the data stored in the first storage based on a predetermined priority list to determine a priority of the data; and
a controller which reads the data from the AP to store the data in the first storage and transmits the data having the priority determined by the priority determiner to the AP to process the data according to the priority,
wherein the priority determiner determines the priority according to at least one of standards of types of business performed by the data to be processed and types of users having requested the data to be processed.

5. The priority processor of claim 4, further comprising a third storage, wherein the controller arranges the data according to the priority of the data determined by the priority determiner, and stores the arranged data in the third storage.

6. The priority processor of claim 5, wherein the controller transmits the data stored in the third storage to the AP in an order of the arranged data.

7. The priority processor of claim 5, further comprising a second storage which stores the predetermined priority list.

8. The priority processor of claim 5, wherein the priority list further comprises weights given to the standards of types of business and the users.

9. A method of controlling a network communication system, the method comprising:
reading data, which is to be transmitted to a destination, stored in an access point (AP);
giving priority to the read data;
transmitting the data having the priority to the AP; and
processing the data in the AP according to the priority,
wherein the priority is determined by at least one of standards of types of business performed by the data to be processed and types of users having requested the data to be processed.

10. The method of claim 9, wherein the giving of the priority to the data comprises:

storing the data read from the AP;
comparing the data based on a predetermined priority list comprising the at least one of the standards of types of business performed by the data to be processed and users having requested the data to be processed; and
arranging the data according to the priority determined by the comparing.

11. The method of claim 10, wherein the predetermined priority list further comprises weights given to the standards of types of business and the users.

12. The method of claim 9, wherein the reading of the data stored in the AP comprises:
reading memory addresses of the AP storing the data; and
reading the data with reference to the read memory addresses.

13. A network communication system comprising:
an access point (AP) which receives data, which is to be transmitted to a destination, from a plurality of stations, and stores the received data; and
a priority processor which reads the stored data from the AP, determines a priority of the read data, and re-transmits the read data to the AP based on the determined priority of the read data,
wherein the AP transmits the data received from the priority processor in order of receipt from the priority processor to another station,
wherein the priority processor determines the priority of the data to be processed according to at least one of standards of types of business performed by the data to be processed and types of users having requested the data to be processed.

14. A network communication method comprising:
receiving, at an access point (AP), data from a plurality of stations, which data is to be transmitted to a destination;
storing, at the AP, the received data;
reading, by a priority processor, the stored data from the AP;
determining, by the priority processor, a priority of the read data;
re-transmitting, from the priority processor, the read data to the AP based on the determined priority of the read data; and
transmitting, from the AP, the data received from the priority processor to another station in order of receipt from the priority processor,
wherein the priority is determined by at least one of standards of types of business performed by the data to be processed and types of users having requested the data to be processed.

* * * * *